(12) United States Patent
Sun (10) Patent No.: US 11,463,991 B2
(45) Date of Patent: Oct. 4, 2022

(54) RESOURCE MAPPING METHOD AND DEVICE

(71) Applicant: VIVO MOBILE COMMUNICATION CO., LTD., Chang'an Dongguan (CN)

(72) Inventor: Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 96 days.

(21) Appl. No.: 16/638,067

(22) PCT Filed: Aug. 3, 2018

(86) PCT No.: PCT/CN2018/098521
§ 371 (c)(1),
(2) Date: Feb. 10, 2020

(87) PCT Pub. No.: WO2019/029449
PCT Pub. Date: Feb. 14, 2019

(65) Prior Publication Data
US 2020/0221424 A1 Jul. 9, 2020

(30) Foreign Application Priority Data

Aug. 11, 2017 (CN) .......................... 201710687833.3

(51) Int. Cl.
*H04W 4/00* (2018.01)
*H04W 72/04* (2009.01)
*H04W 72/02* (2009.01)

(52) U.S. Cl.
CPC .......... *H04W 72/04* (2013.01); *H04W 72/02* (2013.01)

(58) Field of Classification Search
CPC .......... H04J 2203/0069; H04W 72/04; H04W 72/12
See application file for complete search history.

(56) References Cited

U.S. PATENT DOCUMENTS

| 9,629,147 | B2 | 4/2017 | Seo |
| 2009/0175231 | A1 | 7/2009 | Seo et al. |
| 2009/0245193 | A1 | 10/2009 | Gaal et al. |
| 2009/0316814 | A1* | 12/2009 | Seo ..................... H04W 72/042 375/260 |
| 2012/0057547 | A1 | 3/2012 | Löhr et al. |

(Continued)

FOREIGN PATENT DOCUMENTS

| CN | 101911744 A | 12/2010 |
| CN | 101978645 A | 2/2011 |

(Continued)

OTHER PUBLICATIONS

First Chinese Office Action Application No. 201710687833.3; dated Aug. 7, 2019.

(Continued)

*Primary Examiner* — Shantell L Heiber
(74) *Attorney, Agent, or Firm* — von Briesen & Roper, s.c.

(57) ABSTRACT

A resource mapping method and a resource mapping device are provided. The method includes: determining multiple contiguous virtual resource blocks; and mapping the multiple virtual resource blocks to multiple physical resource blocks in a distributed-type resource mapping manner, where at least two physical resource blocks of the multiple physical resource blocks are contiguous.

20 Claims, 4 Drawing Sheets

(56) References Cited

U.S. PATENT DOCUMENTS

| | | |
|---|---|---|
| 2012/0087331 A1 | 4/2012 | Seo et al. |
| 2013/0010685 A1* | 1/2013 | Kim .................. H03M 13/6508 370/315 |
| 2016/0234860 A1* | 8/2016 | Shimezawa ........... H04L 5/0053 |

FOREIGN PATENT DOCUMENTS

| | | |
|---|---|---|
| CN | 102415187 A | 4/2012 |
| CN | 102870355 A | 1/2013 |
| CN | 103516503 A | 1/2014 |

OTHER PUBLICATIONS

European Search Report Application No. 18845040.7; dated Jul. 27, 2020.

International Search Report & Written Opinion related to Application No. PCT/CN2018/098521; dated Nov. 7, 2018.

Alcatel-Lucent; "VRB addressing for localized and distributed DL transmission", 3GPP TSG-RAN WG1 #50bis, R1-074275, Shanghai, China, Oct. 8-Oct. 12, 2007.

Panasonic; "R-PDCGH search space design", 3GPP TSG RAN WG1 Meeting #62bis, RI-105498, Xi'an, China, Oct. 11-Oct. 15, 2010.

1 Indian Office Action related to IN 202017010278 dated May 27, 2021.

* cited by examiner

RESOURCE MAPPING METHOD AND DEVICE

CROSS-REFERENCE TO RELATED APPLICATION

This application is the US. national phase of PCT Application No. PCT/CN2018/098521 filed on Aug. 3, 2018, which claims a priority to Chinese Patent Application No. 201710687833.3 filed on Aug. 11, 2017, the disclosures of which are incorporated in their entirety by reference herein.

TECHNICAL FIELD

The present disclosure relates to the field of communication, and in particular to a resource mapping method and a resource mapping device.

BACKGROUND

For the future 5th generation (5G) mobile communication system, in order to realize a downlink transmission rate of 20 Gbps and an uplink transmission rate of 10 Gbps, high-frequency transmission technology and large-scale antenna array technology have attracted much attention. During the data transmission process, a network side allocates resources to a user equipment (UE) for data transmission. The UE can communicate with a base station via a downlink and an uplink. To enable better data transmission, resource mapping is needed.

Figure 1:
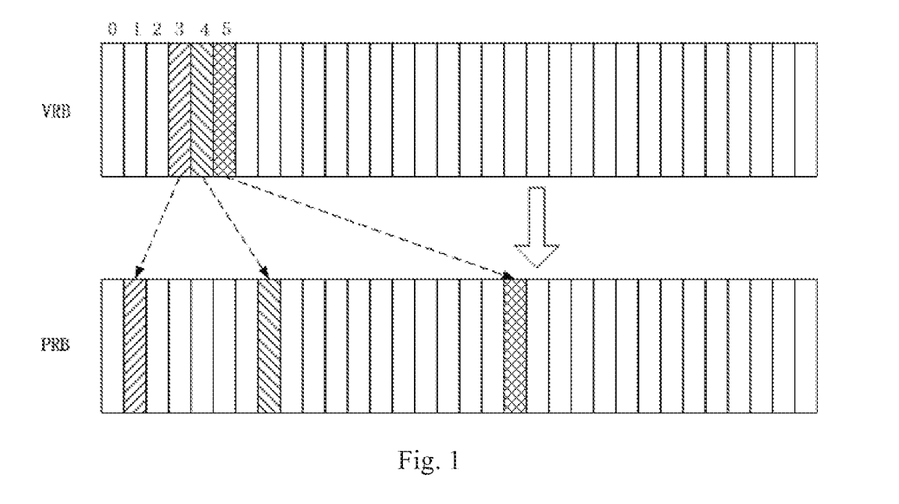
FIG. 1 is a schematic diagram of a resource mapping method in the related technologies.

In the related technologies, Type 2 distributed-type resource mapping method in long term evolution (LTE) as shown in FIG. 1 is adopted. In FIG. 1, resources are mapped from indicated virtual resource blocks (VRBs) to actual physical resource blocks (PRBs). There is a mapping relationship between VRB and PRB. Currently, a new radio (NR) communication system is allowed to adopt Type2 resource allocation manner, but is not yet allowed to adopt this distributed-type resource mapping manner. The reason lies in that: it can be seen from FIG. 1, if the distributed-type resource mapping manner is adopted, the physical resource blocks after mapping will be discontiguous, and thus corresponding processing gain cannot be obtained, causing link performance (especially in low signal-to-noise ratio area) to be greatly affected.

SUMMARY

Embodiments of the present disclosure provide a resource mapping method and a resource mapping device.

In a first aspect, embodiments of the present disclosure provide a resource mapping method, which is implemented by a terminal device and includes:

determining multiple contiguous virtual resource blocks; and mapping the multiple virtual resource blocks to multiple physical resource blocks in a distributed-type resource mapping manner, where at least two physical resource blocks in the multiple physical resource blocks are contiguous.

In a second aspect, embodiments of the present disclosure provide a resource mapping method, which is implemented by a network device and includes:

generating precoding granularity information, where the precoding granularity information is used by a terminal device to determine a precoding granularity adopted by the network device; and transmitting the precoding granularity information to the terminal device, to enable the terminal device to map multiple virtual resource blocks to multiple physical resource blocks based on the precoding granularity information, where the multiple virtual resource blocks are contiguous, and at least two physical resource blocks of the multiple physical resource blocks are contiguous.

In a third aspect, embodiments of the present disclosure provide a terminal device, including:

a first determining module, configured to determine multiple contiguous virtual resource blocks; and a mapping module, configured to map the multiple virtual resource blocks to multiple physical resource blocks in a distributed-type resource mapping manner, where at least two physical resource blocks in the multiple physical resource blocks are contiguous.

In a fourth aspect, embodiments of the present disclosure provide a network device, including:

a first generating module, configured to generate precoding granularity information, where the precoding granularity information is used by a terminal device to determine a precoding granularity adopted by the network device; and a first transmitting module, configured to transmit the precoding granularity information to the terminal device, to enable the terminal device to map multiple virtual resource blocks to multiple physical resource blocks based on the precoding granularity information, where the multiple virtual resource blocks are contiguous, and at least two physical resource blocks of the multiple physical resource blocks are contiguous.

In a fifth aspect, embodiments of the present disclosure provide a terminal device, including:

a processor; and a memory having executable instructions stored thereon, where, when the executable instructions are executed, the resource mapping method implemented by the terminal device as described above is performed by the processor.

In a sixth aspect, embodiments of the present disclosure provide a computer readable storage medium, having one or more programs stored thereon, where, when the one or more programs are executed by a terminal device including one or more applications, the resource mapping method implemented by the terminal device as described above is performed by the terminal device.

In a seventh aspect, embodiments of the present disclosure provide a network device, including:

a processor; and a memory having executable instructions stored thereon, where when the executable instructions are executed, the resource mapping method implemented by the network device as described above is performed by the processor.

In an eighth aspect, embodiments of the present disclosure provide a computer readable storage medium, having one or more programs stored thereon, where, when the one or more programs are executed by a network device including one or more applications, the resource mapping method implemented by the network device as described above is performed by the network device.

BRIEF DESCRIPTION OF THE DRAWINGS

To better clarify technical solutions of embodiments of the present disclosure or in the related technologies, drawings used in description of the embodiments of the present disclosure or the related technologies are briefly introduced hereinafter. Apparently, the described drawings merely illustrate a part of the embodiments of the present disclosure. A person ordinary skilled in the art can obtain other drawings based on the described drawings without any creative efforts.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

The technical solutions of the present disclosure may be applied to various communication systems, such as: Global System of Mobile communication (GSM), Code Division Multiple Access (CDMA) system, Wideband Code Division Multiple Access Wireless (WCDMA), General Packet Radio Service (GPRS), or Long Term Evolution (LTE), etc.

The terminal device may also be called a mobile terminal, a access terminal, a user unit, a user station, a mobile station, a mobile platform, a remote station, a remote terminal, a mobile device, a user terminal, a terminal, a radio communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device or computing device with radio communication function, or other processing device or vehicle-mounted device or wearable device connected to a wireless modem, a terminal device in the future 5G network, or a terminal device in the future evolved Public Land Mobile Network (PLMN) network.

The network device may be a device for communicating with a mobile device. The network device may be a base station (Base Transceiver Station, BTS) in Global System of Mobile communication (GSM) or in Code Division Multiple Access (CDMA), a base station (NodeB, NB) in Wideband Code Division Multiple Access (WCDMA), an eNB or evolutional base station (Evolutional Node B, eNodeB) or access point in LTE, a vehicle-mounted device, a wearable device, a network side device in the future 5G network, or a network side device in the future evolved Public Land Mobile Network (PLMN) network.

A system to which the present disclosure is applicable may be a frequency division duplex (FDD) or time division duplex (TDD) system, or a system where the two duplex modes of FDD and TDD are used in an aggregation manner, which is not limited in the present disclosure.

FIG. 1 is a schematic diagram of a resource mapping method in the related technologies. In FIG. 1, resources are mapped from indicated virtual resource blocks (VRBs) to actual physical resource blocks (PRBs). Each cell (as indicated by the numbers 0, 1, 2, 3, etc., in the drawing) in the virtual resource block VRB and the physical resource block PRB represents a resource block, and cells with different filling modes represent different resource blocks. In addition to the left slash filling mode, the right slash filling mode, and the cross line filling mode shown in FIG. 1, any other one or more filling modes may be adopted, which are not listed herein. It can be seen from FIG. 1 that, after mapping the virtual resource blocks VRB, the physical resource blocks PRB are discontiguous. In addition, distribution positions of the physical resource blocks PRB in the drawing are affected by interleaving process. The interleaving process is conventional and will not be described in detail herein. The interleaving process of resources is also not described in detail in any of the following embodiments of the present disclosure.

Figure 2:
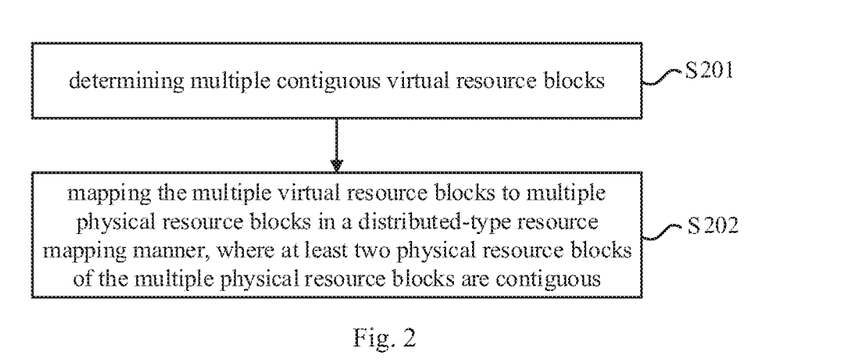
FIG. 2 is a flowchart of a resource mapping method according to an embodiment of the present disclosure.

FIG. 2 is a method flowchart of a resource mapping method in an embodiment of the present disclosure. The method in FIG. 2 is executed by a terminal device, and may include steps S201 to S202.

In step S201, determining multiple contiguous virtual resource blocks.

In this step, the determining the multiple contiguous virtual resource blocks includes determining position information of the multiple contiguous virtual resource blocks.

In step S202, mapping the multiple virtual resource blocks to multiple physical resource blocks in a distributed-type resource mapping manner. At least two physical resource blocks of the multiple physical resource blocks are contiguous.

In this technical solution, when the distributed-type resource mapping manner is adopted to map the multiple virtual resource blocks to the multiple physical resource blocks, it can be ensured that at least two physical resource blocks in the physical resource blocks are contiguous. As compared with the case in the related technologies where physical resource blocks are discontiguous after mapping, this technical solution solves the problem of discontiguous physical resource blocks after mapping. As a result, corresponding processing gain can be obtained, thereby preventing link performance (especially in low signal-to-noise ratio area) from being affected by processing gain.

In the following, the method of the embodiments of the present disclosure will be further described in combination with specific embodiments.

In an embodiment, the terminal device may map the multiple virtual resource blocks to the at least two contiguous physical resource blocks based on a pre-configured mapping rule. The pre-configured mapping rule may be pre-configured by a network device, or may be a mapping rule pre-defined by a network protocol. The pre-configured mapping rule may include a mapping granularity, a mapping manner, or the like, for performing mapping on the multiple virtual resource blocks.

In an embodiment, the terminal device determines a mapping granularity for mapping the multiple virtual resource blocks. Then, the multiple virtual resource blocks may be mapped to the at least two contiguous physical resource blocks based on the determined mapping granularity.

In the embodiments, the terminal device may determine the mapping granularity for mapping the multiple virtual resource blocks based on any of a first manner or a second manner in the following.

First manner: the mapping granularity for mapping the multiple virtual resource blocks is determined based on precoding granularity information transmitted by a network device. When the first manner is adopted, the terminal device receives the precoding granularity information transmitted by the network device. The precoding granularity information is used by the terminal device to determine the preceding granularity used by the network device.

In the first manner, the precoding granularity information transmitted by the network device may be represented in two ways: a) and b).

a) the precoding granularity information is a precoding granularity value.

In this case, the terminal device may use the precoding granularity value as the mapping granularity for mapping the multiple virtual resource blocks, or, may determine an integral multiple of the precoding granularity value or a value acquired through dividing the precoding granularity value by an integer as the mapping granularity for mapping the multiple virtual resource blocks. For example, in a case that the precoding granularity value is 4, it may be determined that the mapping granularity is 4 (i.e., the precoding granularity value), 8 (i.e., twice the precoding granularity value), or, 2 (i.e., ½ of the precoding granularity value), etc.

b) the preceding granularity information indicates the multiple physical resource blocks.

In this case, the terminal device may determine the mapping granularity for mapping the multiple virtual resource blocks based on the quantity of the multiple physical resource blocks. For example, if the precoding granularity information indicates 4 contiguously allocated physical resource blocks, it may be determined that the mapping granularity for mapping the multiple virtual resource blocks is 4.

Second manner: the mapping granularity for mapping the multiple virtual resource blocks are determined based on a pre-configured mapping rule.

In the second manner, the pre-configured mapping rule may include a mapping granularity for mapping the multiple virtual resource blocks.

In an embodiment, the terminal device may map the multiple virtual resource blocks directly to the at least two contiguous physical resource blocks, where positions of the multiple virtual resource blocks are the same as positions of the physical resource blocks to which the multiple virtual resource blocks are mapped.

In an embodiment, the terminal device receives precoding granularity information transmitted by the network device, where the precoding granularity information is used to indicate the multiple physical resource blocks. In the embodiment, the terminal device maps the multiple virtual resource blocks directly to the at least two contiguous physical resource blocks, where positions of the multiple virtual resource blocks are the same as positions of the physical resource blocks to which the multiple virtual resource blocks are mapped.

In an embodiment, the terminal device may receive resource mapping instruction information transmitted by the network device, where the resource mapping instruction information is used to instruct the terminal device to map the multiple virtual resource blocks to the multiple physical resource blocks in the distributed-type resource mapping manner.

Figure 3:
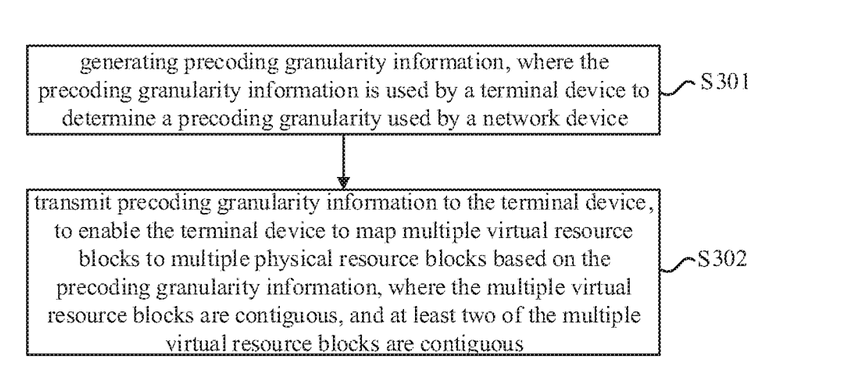
FIG. 3 is a flowchart of a resource mapping method according to another embodiment of the present disclosure.

FIG. 3 is a method flowchart of a resource mapping method in an embodiment of the present disclosure. The method in FIG. 3 is executed by a network device and may include steps S301 to S302.

In step S301, generating precoding granularity information, where the precoding granularity information is used by a terminal device to determine a precoding granularity used by a network device.

In step S302, transmitting the precoding granularity information to the terminal device, to enable the terminal device to map multiple virtual resource blocks to multiple physical resource blocks based on the precoding granularity information. The multiple virtual resource blocks are contiguous. At least two physical resource blocks of the multiple physical resource blocks are contiguous.

In this technical solution, the network device can transmit to the terminal device the precoding granularity information for determining the precoding granularity used by the network device, so that the terminal device can map the multiple contiguous virtual resource blocks to the multiple physical resource blocks based on the precoding granularity information, and at least two physical resource blocks in the multiple physical resource blocks are contiguous. It can be seen that this technical solution solves the problem in the related technologies that physical resource blocks are discontiguous after mapping virtual resource blocks. As a result, corresponding processing gain can be obtained, thereby preventing link performance (especially in low signal-to-noise ratio area) form being affected by processing gain.

In the following, the method of the embodiments of the present disclosure will be further described in combination with specific embodiments.

In an embodiment, before transmitting the precoding granularity information to the terminal device, the network device may generate resource mapping instruction information, and transmit the resource mapping instruction information to the terminal device. The resource mapping instruction information is used to instruct the terminal device to map the multiple virtual resource blocks to the multiple physical resource blocks in a distributed-type resource mapping manner.

In the foregoing embodiments, the precoding granularity information transmitted by the network device to the terminal device may be represented in two ways: c) and d).

c) the precoding granularity information is a precoding granularity value.

In this case, the network device transmits the precoding granularity value to the terminal device. The terminal device may determine the mapping granularity for mapping the multiple virtual resource blocks based on the received precoding granularity value. The specific determination method has been described in detail in the foregoing embodiments, and is not repeated here.

d) the precoding granularity information indicates the multiple physical resource blocks.

In this case, the network device indicates the multiple physical resource blocks to the terminal device. The terminal device may determine the mapping granularity for mapping the multiple virtual resource blocks based on the quantity of the indicated multiple physical resource blocks. The specific determination method has also been described in detail in the above embodiments, and is not repeated here.

In the following, two specific embodiments are provided to exemplarily illustrate the interaction process between the terminal device and the network device when the foregoing resource mapping method is performed. The interaction between the network device and the terminal device is not limited to the following two embodiments.

Figure 4:
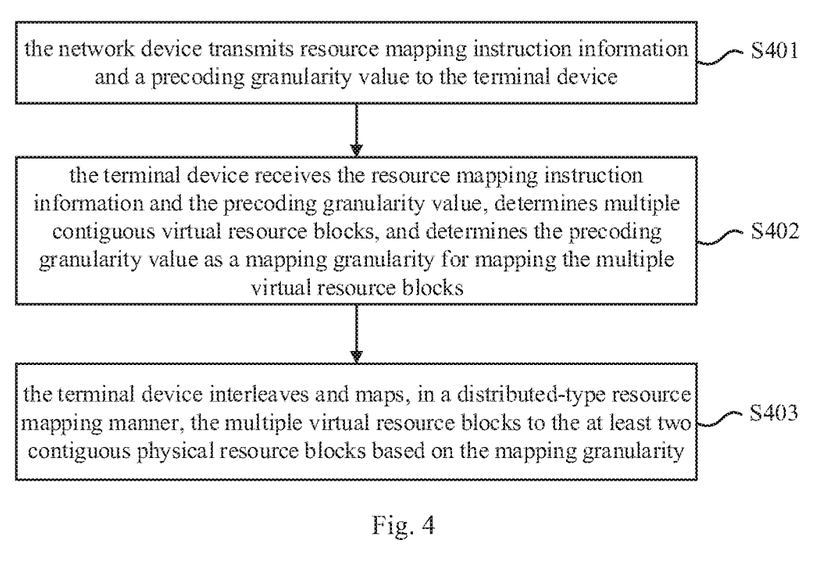
FIG. 4 is a flowchart of a resource mapping method according to a specific embodiment of the present disclosure.

FIG. 4 is a method flowchart of a resource mapping method in a specific embodiment of the present disclosure. As shown in FIG. 4, the method includes steps S401 to S403.

In step S401, the network device transmits resource mapping instruction information and a precoding granularity value to the terminal device.

The resource mapping instruction information is used to instruct the terminal device to map multiple virtual resource blocks to multiple physical resource blocks in a distributed-type resource mapping manner.

In step S402, the terminal device receives the resource mapping instruction information and the precoding granularity value, determines multiple contiguous virtual resource blocks, and determines the precoding granularity value as a mapping granularity for mapping the multiple virtual resource blocks.

In this step, determining the multiple contiguous virtual resource blocks includes determining position information of the multiple contiguous virtual resource blocks.

In step S403, the terminal device interleaves and maps, in a distributed-type resource mapping manner, the multiple virtual resource blocks to the at least two contiguous physical resource blocks based on the mapping granularity.

Figure 5:
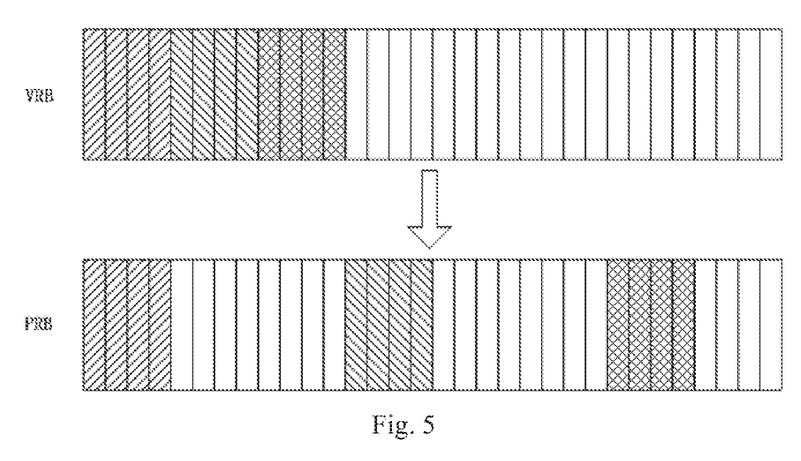
FIG. 5 is a schematic diagram of mapping of a resource mapping method according to a specific embodiment of the present disclosure.

For example, the network device transmits resource mapping instruction information and a precoding granularity value of 4 to the terminal device. After receiving the precoding granularity value of 4, the terminal device may determine that the mapping granularity for mapping the multiple virtual resource blocks is 4. It is assumed that the multiple contiguous virtual resource blocks determined by the terminal device are shown by VRB in FIG. 5. Cells with different filling modes represent different resource blocks, that is, there are three different groups of virtual resource blocks in the drawing: a group of virtual resource blocks filled with a left slash filling mode, a group of virtual resource blocks filled with a right slash filling mode, and a group of virtual resource blocks filled with a cross line filling mode, and each group of virtual resource blocks are contiguous. The result of interleaving and mapping the multiple virtual resource blocks to the at least two contiguous physical resource blocks by the terminal device based on the mapping granularity of 4 is shown by PRB in FIG. 5. It can be seen from FIG. 5 that in the physical resource blocks after mapping, each group of physical resource blocks is contiguous.

Figure 6:
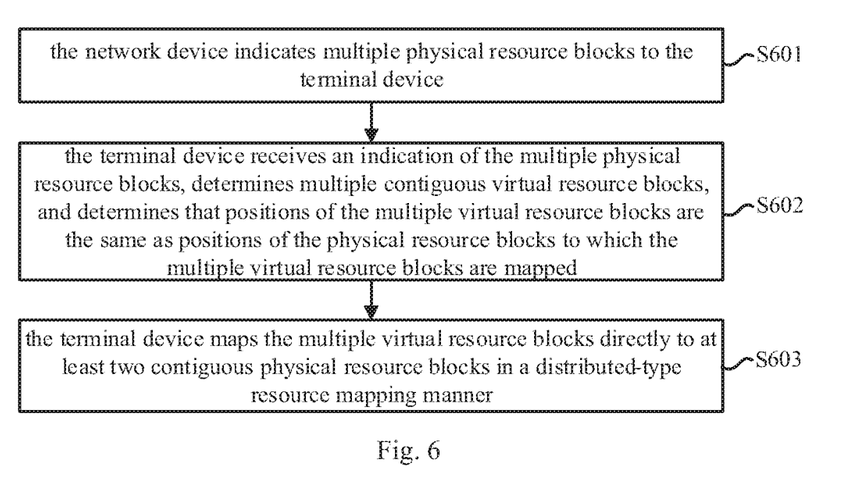
FIG. 6 is a flowchart of a resource mapping method according to a specific embodiment of the present disclosure.

FIG. 6 is a method flowchart of a resource mapping method in a specific embodiment of the present disclosure. As shown in FIG. 6, the method includes steps S601 to S603.

In step S601: the network device indicates multiple physical resource blocks to the terminal device.

In step S602: the terminal device receives an indication of the multiple physical resource blocks, determines multiple contiguous virtual resource blocks, and determines that positions of the multiple virtual resource blocks are the same as positions of the physical resource blocks to which the multiple virtual resource blocks are mapped.

In this step, the determining the multiple contiguous virtual resource blocks includes determining position information of the multiple contiguous virtual resource blocks.

In step S603: the terminal device maps the multiple virtual resource blocks directly to at least two contiguous physical resource blocks in a distributed-type resource mapping manner.

Figure 7:
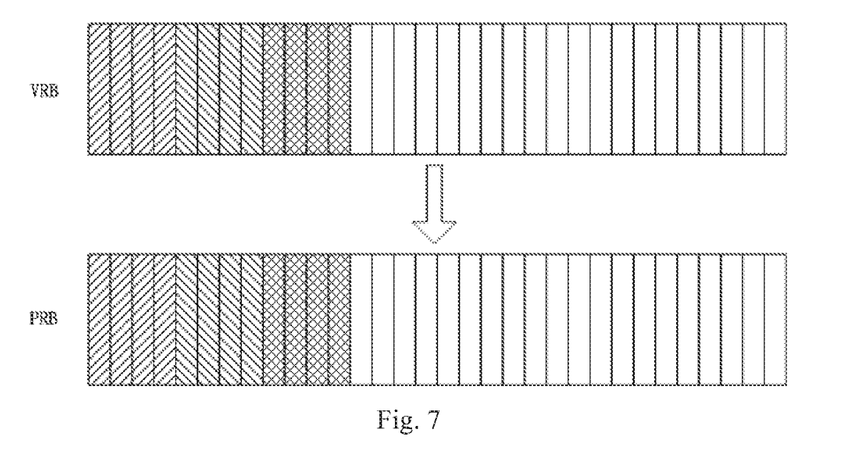
FIG. 7 is a schematic diagram of mapping of a resource mapping method according to a specific embodiment of the present disclosure.

For example, the network device indicates multiple physical resource blocks to the terminal device, and the terminal device determines, based on the indication, that positions of the multiple virtual resource blocks are the same as positions of the physical resource blocks to which the multiple virtual resource blocks are mapped. It is assumed that multiple contiguous virtual resource blocks determined by the terminal device are shown by VRB in FIG. 7. Cells with different filling modes represent different resource blocks, that is, there are three different groups of virtual resource blocks in the drawing: a group of virtual resource blocks filled with a left slash filling mode, a group of virtual resource blocks filled with a right slash filling mode, and a group of virtual resource blocks filled with a cross line filling mode, and each group of virtual resource blocks are contiguous. The result of mapping the multiple virtual resource blocks directly to the at least two contiguous physical resource blocks by the terminal device based on the above indication is shown by PRB in FIG. 7. It can be seen from FIG. 7 that, in the physical resource blocks after mapping, each group of physical resource blocks is contiguous, and positions of the multiple virtual resource blocks are the same as positions of the physical resource blocks to which the multiple virtual resource blocks are mapped.

In addition to the above specific embodiments, there are many other ways for the network device and the terminal device to interactively execute the resource mapping method. For example, in a case that the network device indicates multiple contiguously allocated physical resource blocks to the terminal device, the terminal device may map multiple virtual resource blocks directly to at least two contiguous physical resource blocks based on the indication, or may map multiple virtual resource blocks to at least two contiguous physical resource blocks based on a pre-configured mapping rule. Specifically, if the mapping rule specifies a mapping granularity of 4, the terminal device maps multiple virtual resource blocks to at least two contiguous physical resource blocks based on the mapping granularity of 4; if the mapping rule specifies that positions of the multiple virtual resource blocks are the same as positions of the physical resource blocks to which the multiple virtual resource blocks are mapped, the terminal device maps multiple virtual resource blocks directly to at least two contiguous physical resource blocks; and so on. Other interaction ways are similar to the several ways mentioned above, which are not listed herein.

The specific embodiments of the present specification are described above. Other embodiments fall within the scope of the claims. In some cases, the actions or steps recited in the claims may be performed in a different order than in the embodiments, and the desired result may still be achieved. In addition, the processes depicted in the drawings do not necessarily require the shown particular order or sequential order to achieve the desired results. In some implementations, multitasking and parallel processing are practicable or may be advantageous.

Figure 8:
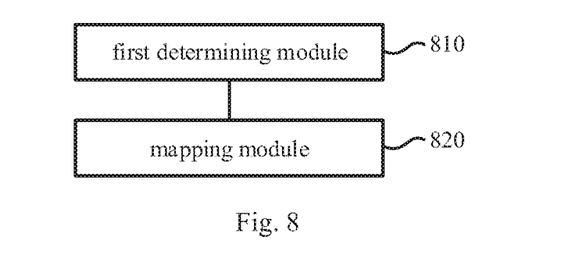
FIG. 8 is a schematic structural diagram of a terminal device according to an embodiment of the present disclosure.

FIG. 8 is a schematic structural diagram of a terminal device according to an embodiment of the present disclosure. Referring to FIG. 8, the terminal device may include:

a first determining module 810, configured to determine multiple contiguous virtual resource blocks; and a mapping module 820, configured to map the multiple virtual resource blocks to multiple physical resource blocks in a distributed-type resource mapping manner, where at least two physical resource blocks in the multiple physical resource blocks are contiguous.

In an embodiment, the mapping module 820 includes:

a first mapping unit, configured to map the multiple virtual resource blocks to the at least two contiguous physical resource blocks based on a pre-configured mapping rule.

In an embodiment, the terminal device further includes:

a second determining module, configured to determine a mapping granularity for mapping the multiple virtual resource blocks.

The mapping module 820 includes:

a second mapping unit, configured to map the multiple virtual resource blocks to the at least two contiguous physical resource blocks based on the mapping granularity.

In an embodiment, the terminal device further includes:

a first receiving module, configured to receive precoding granularity information transmitted by a network device, where the precoding granularity information is used by the terminal device to determine a precoding granularity used by the network device.

The second determining module includes:

a first determining unit, configured to determine the mapping granularity related to the precoding granularity information.

In an embodiment, the precoding granularity information is a precoding granularity value.

The first determining unit is further configured to:

determine the precoding granularity value as the mapping granularity; or, determine an integral multiple of the precoding granularity value or the precoding granularity value divided by an integer as the mapping granularity.

In an embodiment, the precoding granularity information indicates multiple physical resource blocks.

The first determining unit is further configured to:

determine the mapping granularity based on the quantity of the multiple physical resource blocks.

In an embodiment, the second determining module includes:

a second determining unit, configured to determine the mapping granularity based on a pre-configured mapping rule.

In an embodiment, the mapping module 820 includes:

a third mapping unit, configured to map the multiple virtual resource blocks directly to the at least two contiguous physical resource blocks, where positions of the multiple virtual resource blocks are the same as positions of the physical resource blocks to which the multiple virtual resource blocks are mapped.

In an embodiment, the mapping module 820 further includes:

a receiving unit, configured to receive precoding granularity information transmitted by a network device before mapping the multiple virtual resource blocks directly to the at least two contiguous physical resource blocks, where the precoding granularity information is used to indicate the multiple physical resource blocks.

In an embodiment, the terminal device further includes:

a second receiving module, configured to receive resource mapping instruction information transmitted by a network device, where the resource mapping instruction information is used to instruct the terminal device to map the multiple virtual resource blocks to the multiple physical resource blocks in the distributed-type resource mapping manner.

Figure 9:
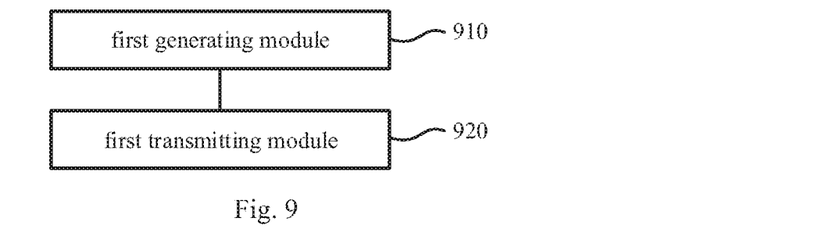
FIG. 9 is a schematic structural diagram of a network device according to an embodiment of the present disclosure.

FIG. 9 is a schematic structural diagram of a network device according to an embodiment of the present disclosure. Referring to FIG. 9, the network device may include:

a first generating module 910, configured to generate precoding granularity information, where the precoding granularity information is used by a terminal device to determine a precoding granularity used by the network device; and a first transmitting module 920, configured to transmit the precoding granularity information to the terminal device, to enable the terminal device to map multiple virtual resource blocks to multiple physical resource blocks based on the precoding granularity information, where the multiple virtual resource blocks are contiguous, and at least two physical resource blocks of the multiple physical resource blocks are contiguous.

In an embodiment, the network device further includes:

a second generating module, configured to generate resource mapping instruction information before transmitting the precoding granularity information to the terminal device, where the resource mapping instruction information is used to instruct the terminal device to map the multiple virtual resource blocks to the multiple physical resource block in a distributed-type resource mapping manner; and a second transmitting module, configured to transmit the resource mapping instruction information to the terminal device.

In an embodiment, the precoding granularity information is a precoding granularity value.

The first transmitting module 920 includes:

a first transmitting unit, configured to transmit the precoding granularity value to the terminal device.

In an embodiment, the precoding granularity information indicates the multiple physical resource blocks.

The first transmitting module 920 includes:

a second transmitting unit, configured to indicate the multiple physical resource blocks to the terminal device.

Figure 10:
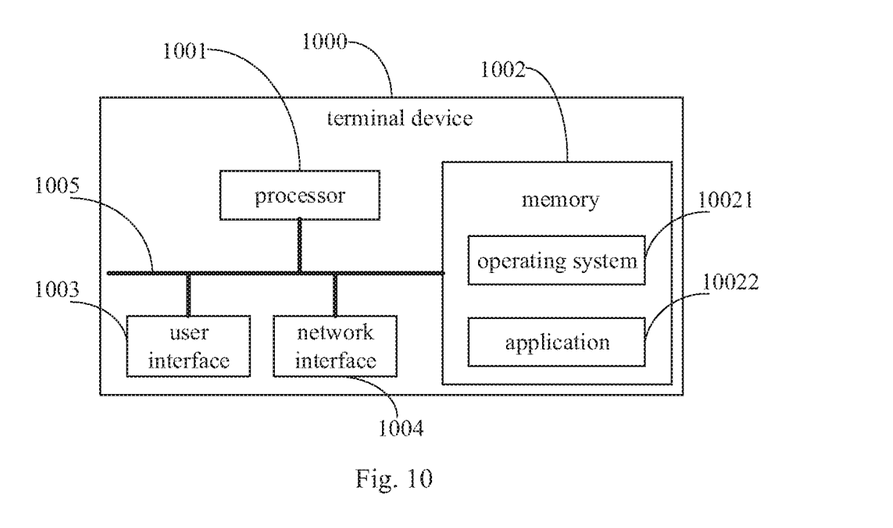
FIG. 10 is a schematic structural diagram of a terminal device according to another embodiment of the present disclosure.

FIG. 10 is a block diagram of a terminal device according to another embodiment of the present disclosure. The terminal device 1000 shown in FIG. 10 includes: at least one processor 1001, a memory 1002, at least one network interface 1004, and a user interface 1003. The various components in the terminal device 1000 are coupled together through a bus system 1005. It can be understood that the bus system 1005 is configured to implement connection and communication between these components. In addition to a data bus, the bus system 1005 includes a power bus, a control bus, and a state signal bus. However, for clarity, various buses are marked as the bus system 1005 in FIG. 10.

The user interface 1003 may include a display, a keyboard, a clicking device (such as, a mouse, or a trackball), a touch pad, or a touch screen.

It can be understood that the memory 1002 in the embodiments of the present disclosure may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) or a direct rambus random access memory (Direct Rambus RAM, DRRAM). The memory 1002 described in the embodiments of the present disclosure is intended to include, without being limited to, these and any other suitable types of memories.

In some implementations, the memory 1002 stores the following elements, executable modules or data structures, or a subset thereof, or an extended set thereof: operating system 10021 and application 10022.

The operating system 10021 includes various system programs such as a framework layer, a core library layer and a driving layer, for implementing various fundamental services and processing hardware-based tasks. The application 10022 includes various applications such as media player and browser, for implementing various application services. A program for implementing the method according to the embodiments of the present disclosure may be included in the application 10022.

In the embodiment of the present disclosure, the terminal device 1000 further includes a computer program stored in the memory 1009 and executable by the processor 1010. When the computer program is executed by the processor 1001, the following steps are implemented:

determining multiple contiguous virtual resource blocks; and mapping the multiple virtual resource blocks to multiple physical resource blocks in a distributed-type resource mapping manner, where at least two physical resource blocks in the multiple physical resource blocks are contiguous.

The method according to the above embodiments of the present disclosure may be applied to the processor 1001 or implemented by the processor 1001. The processor 1001 may be an integrated circuit chip with signal processing capabilities. In implementation, each step of the foregoing methods may be completed by an integrated logic circuit in form of hardware in the processor 1001 or instructions in form of software. The processor 1001 above may be a general-purpose processor, a digital signal processor (DSP), an application specific integrated circuit (ASIC), a field programmable gate array (FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed computer readable storage medium such as a random access memory, a flash memory, a read-only memory, a programmable read-only memory, an electrically erasable programmable memory, a register, or the like. The computer readable storage medium is located in the memory 1002, and the processor 1001 reads the information in the memory 1002 and completes the steps of the above methods in combination with its hardware. Specifically, a computer program is stored on the computer readable storage medium, and when the computer program is executed by the processor 1001, the steps of the embodiments directed to the resource mapping method performed by the terminal device are implemented.

It can be understood that the embodiments described herein may be implemented in hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, other electronics units for performing the functions according to the present disclosure or a combination thereof.

For software implementation, the technical solutions according to the embodiments of the present disclosure may be implemented by modules (e.g., processes, functions, and so on) for performing the functions according to the embodiments of the present disclosure. Software codes may be stored in a memory and executed by a processor. The memory may be implemented in the processor or external to the processor.

Optionally, when the computer program is executed by the processor 1001, the following step may be implemented:

mapping the multiple virtual resource blocks to the at least two contiguous physical resource blocks based on a pre-configured mapping rule.

Optionally, when the computer program is executed by the processor 1001, the following steps may be implemented:

determining a mapping granularity for mapping the multiple virtual resource blocks; and mapping the multiple virtual resource blocks to the at least two contiguous physical resource blocks based on the mapping granularity.

Optionally, when the computer program is executed by the processor 1001, the following steps may be implemented:

receiving precoding granularity information transmitted by a network device, where the precoding granularity information is used by the terminal device to determine a precoding granularity used by the network device; and determining the mapping granularity related to the precoding granularity information.

Optionally, the precoding granularity information is a precoding granularity value; when the computer program is executed by the processor 1001, the following steps may be implemented:

determining the precoding granularity value as the mapping granularity; or, determining an integral multiple of the precoding granularity value or the precoding granularity value divided by an integer as the mapping granularity.

Optionally, the precoding granularity information indicates the multiple physical resource blocks; when the computer program is executed by the processor 1001, the following step may be implemented:

determining the mapping granularity based on the quantity of the multiple physical resource blocks.

Optionally, when the computer program is executed by the processor 1001, the following steps may be implemented:

determining the mapping granularity based on a pre-configured mapping rule.

Optionally, when the computer program is executed by the processor 1001, the following steps may be implemented:

mapping the multiple virtual resource blocks directly to the at least two contiguous physical resource blocks, where positions of the multiple virtual resource blocks are the same as positions of the physical resource blocks to which the multiple virtual resource blocks are mapped.

Optionally, when the computer program is executed by the processor 1001, the following step may be implemented:

receiving precoding granularity information transmitted by a network device, where the precoding granularity information is used to indicate the multiple physical resource blocks.

Optionally, when the computer program is executed by the processor 1001, the following step may be implemented:

receiving resource mapping instruction information transmitted by a network device, where the resource mapping instruction information is used to instruct the terminal device to map the multiple virtual resource blocks to the multiple physical resource blocks in the distributed-type resource mapping manner.

The terminal device 1000 can implement the processes implemented by the terminal device in the foregoing embodiments. To avoid repetition, details are not described herein.

In the above technical solution, when the multiple virtual resource blocks are mapped to the multiple physical resource blocks in the distributed-type resource mapping manner, it can be ensured that at least two physical resource blocks in the multiple physical resource block are contiguous. As compared with the case in the related technologies where physical resource blocks are discontiguous after mapping, this technical solution solves the problem of discontiguous physical resource blocks after mapping. As a result, corresponding processing gain can be obtained, thereby preventing link performance (especially in low signal-to-noise ratio area) from being affected by processing gain.

Figure 11:
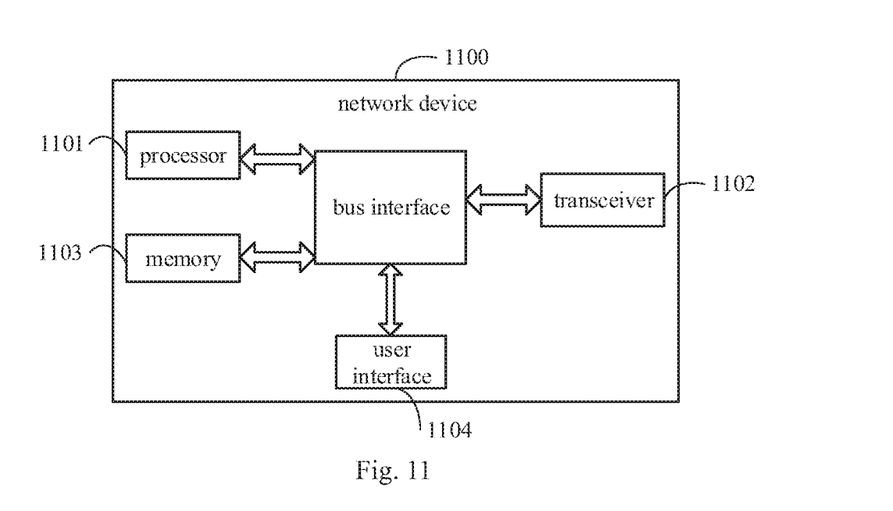
FIG. 11 is a schematic structural diagram of a network device according to another embodiment of the present disclosure.

Reference is made to FIG. 11, which is a structural diagram of a network device to which the embodiments of the present disclosure are applied. The network device can implement the details of the resource mapping method performed by the network device in the above embodiments, and achieve the same effect. As shown in FIG. 11, the network device 1100 includes: a processor 1101, a transceiver 1102, a memory 1103, a user interface 1104, and a bus interface.

In embodiments of the present disclosure, the network device 1100 further includes a computer program stored in the memory 1103 and executable by the processor 1101. When the computer program is executed by the processor 1101, the following steps are implemented:

generating precoding granularity information, where the precoding granularity information is used by a terminal device to determine a precoding granularity used by the network device; and transmitting the precoding granularity information to the terminal device, to enable the terminal device to map multiple virtual resource blocks to multiple physical resource blocks based on the precoding granularity information, where the multiple virtual resource blocks are contiguous, and at least two physical resource blocks of the multiple physical resource blocks are contiguous.

In FIG. 11, a bus architecture may include any quantity of interconnected buses and bridges. Various circuits including one or more processors represented by the processor 1101 and a memory represented by the memory 1103 are coupled together. The bus architecture may also couple various other circuits such as a peripheral component, a voltage regulator, and a power management circuit, which are well known in the art and thus are not further described herein. The bus interface provides an interface. The transceiver 1102 may be multiple elements, i.e., including a transmitter and a receiver, which provides a unit for communicating with various other devices on a transmission medium. For different UEs, the user interface 1104 may be an interface capable of connecting needed external or internal devices. The connected devices include, but not limited to, a keypad, a display, a speaker, a microphone, a joystick, and the like.

The processor 1101 may be in charge of managing the bus architecture and common processes. The memory 1103 may be configured to store data used by the processor 1101 in performing operations.

Optionally, when the computer program is executed by the processor 1103, the following steps may be implemented:

generating resource mapping instruction information, where the resource mapping instruction information is used to instruct the terminal device to map the multiple virtual resource blocks to the multiple physical resource blocks in a distributed-type resource mapping manner; and transmitting the resource mapping instruction information to the terminal device.

Optionally, the precoding granularity information is a precoding granularity value; when the computer program is executed by the processor 1103, the following step may be implemented:

transmitting the precoding granularity value to the terminal device.

Optionally, the preceding granularity information indicates the multiple physical resource blocks; when the computer program is executed by the processor 1103, the following step may be implemented:

indicating the multiple physical resource blocks to the terminal device.

For the network device according to the embodiments of the present disclosure, a paging message is transmitted to the terminal device, and if there is a data transmitting instruction, indicating transmitting, in the paging message, a downlink data packet is transmitted to the terminal device. In this way, after the paging message is transmitted, the downlink data packet can be directly transmitted, which is different from the case in the conventional technologies where the downlink data packet needs to be transmitted by establishing an RRC connection after receiving the paging message, thereby reducing delay of transmission of the downlink data packet.

In summary, the above descriptions are merely optional embodiments of the present disclosure, and are not intended to limit the protection scope of the present disclosure. Any modification, equivalent replacement, or improvement made within the spirit and principle of the present disclosure shall fall within the protection scope of the present disclosure.

The system, device, module, or unit described in the foregoing embodiments may be specifically implemented by a computer chip or entity, or implemented by a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

The computer readable media includes permanent and non-permanent, removable and non-removable media. Information may be stored by any method or technology. Information may be computer readable instructions, data structures, modules of a program, or other data. Examples of computer storage media include, but are not limited to, Phase-Change RAM (PRAM), Static Random Access Memory (SRAM), Dynamic Random Access Memory (DRAM), and other type of Random access memory (RAM), read-only memory (ROM), electrically erasable programmable read-only memory (Electrically EPROM, EEPROM), flash memory or other memory technologies, CD-ROM, DVD or other optical storage, magnetic cartridge tape, tape disk storage or other magnetic storage device, or any other non-transmitting medium, which can be used to store information accessible by a computing device. As defined herein, the computer readable medium does not include transitory computer readable medium (transitory media) such as modulated data signals and carrier waves.

It should also be noted that, terms such as "include" and "have" and any variations thereof are intended to cover non-exclusive inclusion, such that a process, method, product, or device including a series of elements is not limited to those elements, but may optionally include other elements that are not explicitly listed or that are inherent in the process, method, product, or device. Without more limitations, an element defined by the expression "including a . . . " does not exclude the existence of other identical elements in a process, method, product or device including the element.

Various embodiments in the specification are described in a progressive manner, and reference can be made to each other for the same or similar parts among the various embodiments. Each embodiment focuses on the differences from other embodiments. In particular, for the system embodiments, since they are basically similar to the method embodiments, the description thereof is relatively simple, and reference can be made to the description of the method embodiments for related parts.

What is claimed is:

1. A resource mapping method, implemented by a terminal device, comprising:
    determining a plurality of contiguous virtual resource blocks; and
    mapping the plurality of virtual resource blocks to a plurality of physical resource blocks in a distributed-type resource mapping manner, wherein at least two physical resource blocks in the plurality of physical resource blocks are contiguous;
    wherein the method further comprises: determining a mapping granularity for mapping the plurality of virtual resource blocks;
    wherein, the mapping the plurality of virtual resource blocks to the plurality of physical resource blocks comprises: mapping the plurality of virtual resource blocks to the at least two contiguous physical resource blocks based on the mapping granularity;
    wherein N contiguous virtual resource blocks are mapped to N contiguous physical resource blocks in the distributed-type resource mapping manner, and N is the mapping granularity; wherein N is an integer larger than or equal to 2;
    wherein each of the N contiguous virtual resource blocks is mapped to one physical resource block of the N contiguous physical resource blocks in the distributed-type resource mapping manner;
    wherein the method further comprises: receiving precoding granularity information transmitted by a network device, wherein the precoding granularity information is used by the terminal device to determine a precoding granularity adopted by the network device;
    wherein the determining the mapping granularity for mapping the plurality of virtual resource comprises: determining the mapping granularity related to the precoding granularity information;
    wherein the precoding granularity information is a precoding granularity value, and the determining the mapping granularity related to the precoding granularity information comprises: determining the precoding granularity value as the mapping granularity, or, determining an integral multiple of the precoding granularity value or the precoding granularity value divided by an integer as the mapping granularity; or,
    wherein the precoding granularity information is for indicating the plurality of physical resource blocks, and the determining the mapping granularity related to the precoding granularity information comprises: determining the mapping granularity based on the quantity of the plurality of physical resource blocks.

2. The method according to claim 1, wherein the mapping the plurality of virtual resource blocks to the plurality of physical resource blocks comprises: mapping the plurality of virtual resource blocks to the at least two contiguous physical resource blocks based on a pre-configured mapping rule.

3. The method according to claim 1, wherein the determining the mapping granularity for mapping the plurality of virtual resource blocks comprises: determining the mapping granularity based on a pre-configured mapping rule.

4. The method according to claim 1, wherein the mapping the plurality of virtual resource blocks to the plurality of physical resource blocks comprises: mapping the plurality of virtual resource blocks directly to the at least two contiguous physical resource blocks, wherein positions of the plurality of virtual resource blocks are the same as positions of the physical resource blocks to which the plurality of virtual resource blocks are mapped.

5. The method according to claim 4, wherein before the mapping the plurality of virtual resource blocks directly to the at least two contiguous physical resource blocks, the method further comprises: receiving precoding granularity information transmitted by a network device, wherein the precoding granularity information is for indicating the plurality of physical resource blocks.

6. The method according to claim 1, further comprising: receiving resource mapping instruction information transmitted by a network device, wherein the resource mapping instruction information is for instructing the terminal device to map the plurality of virtual resource blocks to the plurality of physical resource blocks in the distributed-type resource mapping manner.

7. A computer readable storage medium, having one or more programs stored thereon, wherein, when the one or more programs are executed by a terminal device including one or more applications, the method according to claim 1 is implemented by the terminal device.

8. The computer readable storage medium according to claim 7, wherein the mapping the plurality of virtual resource blocks to the plurality of physical resource blocks comprises: mapping the plurality of virtual resource blocks to the at least two contiguous physical resource blocks based on a pre-configured mapping rule.

9. The computer readable storage medium according to claim 7, wherein the determining the mapping granularity for mapping the plurality of virtual resource blocks comprises: determining the mapping granularity based on a pre-configured mapping rule.

10. The computer readable storage medium according to claim 7, wherein the method further comprises: receiving resource mapping instruction information transmitted by a network device, wherein the resource mapping instruction information is for instructing the terminal device to map the plurality of virtual resource blocks to the plurality of physical resource blocks in the distributed-type resource mapping manner.

11. A resource mapping method, implemented by a network device, comprising:
   generating precoding granularity information, wherein the precoding granularity information is used by a terminal device to determine a precoding granularity adopted by the network device; and
   transmitting the precoding granularity information to the terminal device, to enable the terminal device to map a plurality of virtual resource blocks to a plurality of physical resource blocks based on the precoding granularity information, wherein the plurality of virtual resource blocks are contiguous, and at least two physical resource blocks of the plurality of physical resource blocks are contiguous;
   wherein N contiguous virtual resource blocks are mapped to N contiguous physical resource blocks in the distributed-type resource mapping manner, and N is the mapping granularity; wherein N is an integer larger than or equal to 2;
   wherein each of the N contiguous virtual resource blocks is mapped to one physical resource block of the N contiguous physical resource blocks in the distributed-type resource mapping manner;
   wherein the precoding granularity information is a precoding granularity value, and the transmitting the precoding granularity information to the terminal device comprises: transmitting the precoding granularity value to the terminal device; or,
   wherein the precoding granularity information is for indicating the plurality of physical resource blocks, and the transmitting the precoding granularity information to the terminal device comprises: indicating the plurality of physical resource blocks to the terminal device.

12. The method according to claim 11, wherein before the transmitting the precoding granularity information to the terminal device, the method further comprises: generating resource mapping instruction information, wherein the resource mapping instruction information is for instructing the terminal device to map the plurality of virtual resource blocks to the plurality of physical resource blocks in a distributed-type resource mapping manner; and transmitting the resource mapping instruction information to the terminal device.

13. A network device, comprising a processor, and a memory having executable instructions stored thereon, wherein, when the executable instructions are executed, the method according to claim 11 is implemented by the processor.

14. The network device according to claim 13, wherein the processor is configured to: generate resource mapping instruction information before transmitting the precoding granularity information to the terminal device, wherein the resource mapping instruction information is for instructing the terminal device to map the plurality of virtual resource blocks to the plurality of physical resource blocks in a distributed-type resource mapping manner, and transmit the resource mapping instruction information to the terminal device.

15. A terminal device, comprising a processor, and a memory having executable instructions stored thereon, wherein, when the executable instructions are executed, the following steps are implemented by the processor:
   determining a plurality of contiguous virtual resource blocks; and
mapping the plurality of virtual resource blocks to a plurality of physical resource blocks in a distributed-type resource mapping manner, wherein at least two physical resource blocks in the plurality of physical resource blocks are contiguous;
   wherein the processor is configured to: determine a mapping granularity for mapping the plurality of virtual resource blocks, and map the plurality of virtual resource blocks to the at least two contiguous physical resource blocks based on the mapping granularity;
   wherein N contiguous virtual resource blocks are mapped to N contiguous physical resource blocks in the distributed-type resource mapping manner, and N is the mapping granularity; wherein N is an integer larger than or equal to 2;
   wherein each of the N contiguous virtual resource blocks is mapped to one physical resource block of the N contiguous physical resource blocks in the distributed-type resource mapping manner;
   wherein the processor is configured to: receive precoding granularity information transmitted by a network device, wherein the precoding granularity information is used by the terminal device to determine a precoding granularity adopted by the network device; and
   determine the mapping granularity related to the precoding granularity information;
   wherein the precoding granularity information is a precoding granularity value, and the processor is further configured to: determine the precoding granularity values as the mapping granularity, or, determine an integral multiple of the precoding granularity value or the precoding granularity value divided by an integer as the mapping granularity: or,
   wherein the precoding granularity information is for indicating the plurality of physical resource blocks, and the processor is further configured to: determine the mapping granularity based on the quantity of the plurality of physical resource blocks.

16. The terminal device according to claim 15, wherein the processor is configured to: map the plurality of virtual resource blocks to the at least two contiguous physical resource blocks based on a pre-configured mapping rule.

17. The terminal device according to claim 15, wherein the processor is configured to: determine the mapping granularity based on a pre-configured mapping rule.

18. The terminal device according to claim 15, wherein the processor is configured to: map the plurality of virtual resource blocks directly to the at least two contiguous physical resource blocks, wherein positions of the plurality of virtual resource blocks are the same as positions of the physical resource blocks to which the plurality of virtual resource blocks are mapped.

19. The terminal device according to claim 18, wherein the processor is further configured to: receive precoding granularity information transmitted by a network device before mapping the plurality of virtual resource blocks directly to the at least two contiguous physical resource blocks, wherein the precoding granularity information is for indicating the plurality of physical resource blocks.

20. The terminal device according to claim 15, wherein the processor is further configured to: receive resource mapping instruction information transmitted by a network device, wherein the resource mapping instruction information is for instructing the terminal device to map the plurality of virtual resource blocks to the plurality of physical resource blocks in the distributed-type resource mapping manner.

* * * * *